United States Patent
Zhou et al.

(10) Patent No.: US 8,771,396 B2
(45) Date of Patent: Jul. 8, 2014

(54) METHOD FOR PRODUCING BLISTER COPPER DIRECTLY FROM COPPER CONCENTRATE

(71) Applicant: Xiangguang Copper Co., Ltd., Shandong (CN)

(72) Inventors: Songlin Zhou, Shandong (CN); Weidong Liu, Shandong (CN); Zheling Ge, Shandong (CN)

(73) Assignee: Xiangguang Copper Co., Ltd., Shandong (CN)

( * ) Notice: Subject to any disclaimer, the term of this patent is extended or adjusted under 35 U.S.C. 154(b) by 0 days.

(21) Appl. No.: 13/676,853

(22) Filed: Nov. 14, 2012

(65) Prior Publication Data
US 2013/0269481 A1     Oct. 17, 2013

(30) Foreign Application Priority Data
Apr. 16, 2012  (CN) .......................... 2012 1 0111668

(51) Int. Cl.
- C22B 7/04  (2006.01)
- C22B 4/04  (2006.01)
- C22B 15/00  (2006.01)

(52) U.S. Cl.
CPC ... C22B 4/04 (2013.01); C22B 7/04 (2013.01); C22B 15/0047 (2013.01); C22B 15/005 (2013.01); C22B 15/0054 (2013.01)
USPC ............................ 75/10.35; 75/10.4; 75/10.46

(58) Field of Classification Search
CPC ........ C22B 7/04; C22B 15/0047; C22B 4/04; C22B 15/005; C22B 15/0054
USPC .............................. 75/650, 10.35, 10.46, 10.4
See application file for complete search history.

(56) References Cited

U.S. PATENT DOCUMENTS

| | | | |
|---|---|---|---|
| 4,304,595 A | 12/1981 | Peterson | |
| 4,421,552 A * | 12/1983 | Hoffmann et al. | .............. 75/639 |
| 5,772,955 A | 6/1998 | Hanniala et al. | |
| 6,755,890 B1 | 6/2004 | Hanniala et al. | |
| 2005/0199095 A1 | 9/2005 | Hanniala et al. | |
| 2005/0217422 A1 * | 10/2005 | Makinen et al. | ............. 75/10.35 |
| 2006/0037435 A1 | 2/2006 | Hanniala et al. | |

FOREIGN PATENT DOCUMENTS

| | | | |
|---|---|---|---|
| CN | 1044501 A | 8/1990 | |
| CN | 1415023 A | 4/2003 | |
| CN | 1456867 A | 11/2003 | |
| CN | 101665877 A | 3/2010 | |
| CN | 101903543 A | 12/2010 | |
| JP | 58221241 A * | 12/1983 | ............. C22B 15/00 |
| JP | 10-53821 A | 2/1998 | |
| JP | 2000129368 A | 5/2000 | |
| JP | 2006509103 A | 3/2006 | |

(Continued)

*Primary Examiner* — George Wyszomierski
*Assistant Examiner* — Tima M McGuthry Banks
(74) *Attorney, Agent, or Firm* — Schwabe, Williamson & Wyatt

(57) ABSTRACT

A method for producing blister copper directly from copper concentrate is provided, comprising: a) adding copper concentrate, copper matte, slagging material, oxygen enriched air, endothermic material to an upper segment of the reaction furnace; b) adding reducing agent to the lower segment space of the reaction furnace; c) directing the produced hot coke and liquid slag into an electric furnace, and adding copper concentrate into the electric furnace to generate an electric furnace slag and copper matte; d) the copper matte being granulated and finely ground, then re-fed into the reaction furnace.

8 Claims, 1 Drawing Sheet

(56) References Cited

FOREIGN PATENT DOCUMENTS

| | | |
|---|---|---|
| JP | 2006188738 A | 7/2006 |
| JP | 2007515549 A | 6/2007 |
| JP | 2010059501 A | 3/2010 |
| JP | 2012052216 A | 3/2012 |
| JP | 2012250133 A | 12/2012 |
| RU | 2242527 C2 | 12/2004 |
| WO | 02/055746 A1 | 7/2002 |
| WO | 2009077651 A1 | 6/2009 |
| WO | 2009077652 A1 | 6/2009 |
| WO | 2011048265 A1 | 4/2011 |

* cited by examiner

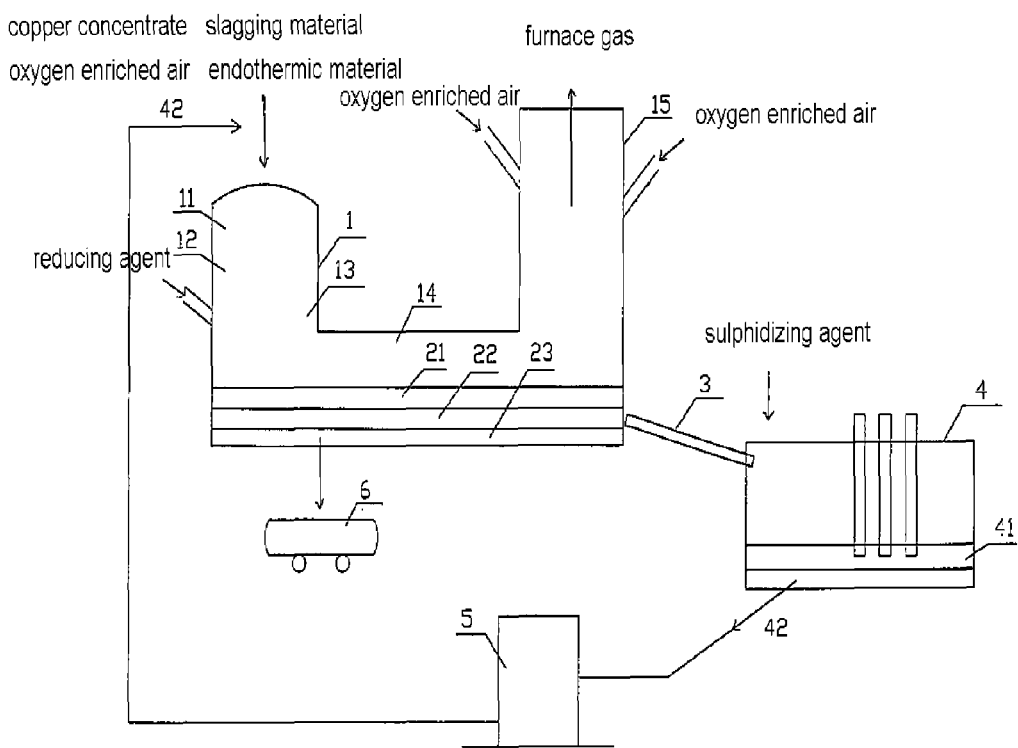

METHOD FOR PRODUCING BLISTER COPPER DIRECTLY FROM COPPER CONCENTRATE

CROSS REFERENCE TO RELATED APPLICATION

The present application claims priority to Chinese Patent Application No. 201210111668.4, filed Apr. 16, 2012, the entire specification of which is hereby incorporated by reference in its entirety for all purposes.

FIELD OF THE INVENTION

The present invention relates to the field of nonferrous metals smelting, in particular, to a method for producing blister copper directly from copper concentrate.

BACKGROUND OF THE INVENTION

In copper pyrometallurgical industry, producing blister copper from sulfide copper concentrate generally relates to two steps, in the first step, sulfide copper concentrate are smelted to desulfurize and remove iron so as to obtain high-grade copper matte, and in the second step, copper matte is further subjected to converting to desulfurize and remove iron so as to obtain blister copper Typical methods include traditional bath smelting plus "PS" converter blowing, Suspension smelting plus "PS" converter blowing, the improved bath smelting plus bath blowing, space (regional) flash smelting+ flash converting, etc. In the space smelting, the degree of oxidation of the copper sulfide concentrate can be controlled by adjusting the oxygen/feed ratio, so as to directly produce blister copper. For example, Australian Olympic Dam smelter applied the process to produce blister copper directly from copper concentrate in 1988. However, the above methods are only suitable for processing high grade copper concentrate with high Cu content and low Fe content (high Fe and low Cu). For example, the method described in CN101665877A can only deal with high-grade copper matte. Although some other methods, as described in CN101903543A, can directly produce blister copper from the copper concentrate, the slag contains a high amount of copper and $Fe_3O_4$, the discharge of the slag is difficult, and the oxygen demand and the amount of slag are relative large. In order to reduce the iron content of the material inside the reaction furnace so as to reduce oxygen demand and the amount of slag, CN1167819C discloses a method in which an additional metallurgical furnace is employed to process copper concentrate to produce matte, and then the matte is mixed with the copper concentrate and added to the reaction furnace. But this method needs additional investment and operating costs, and does not utilize the over-oxidized oxides (e.g. $Cu_2O$ and $Fe_3O_4$) in the furnace slag, and also can not solve the problems, such as high contents of copper and $Fe_3O_4$ in the slag, being hard to discharge slag and low direct recovery rate.

In the above two-steps methods or direct methods, and the above bath smelting or space suspension smelting, the main process relates to removing iron and sulfur so as to produce blister copper from copper concentrate. Sulfur in the copper concentrate is oxidized and thus is removed in the form of $SO_2$, and iron is oxidized and thus is removed in the form of slag. A great deal of heat will be released during both iron oxidation and slagging process, thus complete removal of iron in the copper concentrate in a reaction furnace will increase the oxygen consumption and increase the cost of production. Excessive heat may cause thermal balance difficult to maintain, and the reaction furnace is also unable to bear the huge heat load. Further, since iron has different valences, it can be prone to be over-oxidized to form $Fe_3O_4$ under the strong oxidizing atmosphere in the reaction furnace, resulting in a great deal of copper in the slag, and poor flowability of the slag. CN1456867A discloses a method using a calcium-based material to enhance the dissolving ability of the slag to $Fe_3O_4$, but the method can not reduce the amount of copper in the slag and also faces other problems, such as not able to utilize the gangue ($SiO_2$) in copper concentrate, increase of costs for slagging, corrosion of the slag to the furnace lining.

SUMMARY OF THE INVENTION

The present invention is to provide a method for producing blister copper directly from copper concentrate, which can process low-grade copper concentrate with high Fe and low Cu, can resolve at least one of the above problems in the prior art, such as can reduce the oxygen demand, heat load and amount of the slag in the reaction furnace, and improve the property of the furnace slag.

In one aspect, there is provided a method for producing blister copper directly from copper concentrate, comprising the following steps:

a) Feeding copper concentrate, copper matte, slagging material, oxygen enriched air, an endothermic material together into a reaction furnace from the upper part of the reaction furnace;

b) Feeding a reducing agent to the reaction furnace at the lower part thereof, wherein furnace gas, hot coke layer in solid state, slag layer in liquid state, and blister copper layer in liquid state are formed in the molten bath at the bottom of the reaction furnace;

c) Directing the hot coke and the slag in liquid state into an electric furnace, at the same time feeding sulphidizing agent into the electric furnace to carry out a reaction, so as to generate an electric furnace slag and copper matte;

d) Granulating the copper matte and re-feeding it into the reaction furnace from the upper part of the reaction furnace.

Preferably, the mass ratio of the copper concentrate to the copper matte, slagging material and endothermic material fed in step a) is from 7~9:1 to 2:1, the amount of oxygen-enriched air is 300 $Nm^3/t$~700 $Nm^3/t$ with respect to the copper concentrate and the copper matte, the concentration in volume of oxygen in the oxygen-enriched air is ≥45%.

Preferably, the reaction furnace is a space suspension reaction furnace.

Preferably, the endothermic material is smoke dust, which is collected from the furnace gas discharged from the reaction furnace.

Preferably, the reducing agent in the step b) is granular coke with a particle size of 2 mm 25 mm.

Preferably, the blister copper formed in the step b) is directed into an anode refining furnace to undergo a refining.

Preferably, the sulphidizing agent in the step c) is sulfide copper concentrate with a moisture content of 4 wt % to 10 wt %, the mass ratio of said sulfide copper concentrate to said slag in liquid state is 4~6:1.

Preferably, the electrical furnace slag in the step c) can be used as other industrial raw material after granulation.

Preferably, oxygen-enriched air is directed into up-take shaft of the reaction furnace to burn CO generated in said reaction furnace.

The present invention provides a method for producing blister copper directly from copper concentrate, comprising adding reducing agent to the oxygen free lower segment of the reaction furnace. The reducing agent can not burn, thus will not increase the heat load of the reaction furnace; Over-oxidized $Cu_2O$ and $Fe_3O_4$ are reduced in the reaction furnace, which improve the direct recovery rate of copper, decrease the amount of $Cu_2O$ and $Fe_3O_4$ in the slag, and improve property of the slag. More advantageously, the amount of $Cu_2O$ and $Fe_3O_4$ contained in the slag can be controlled by controlling the thickness of hot coke layer. The slag and hot coke are directed into an electric furnace, in combination with adding sulphidizing agent, preferably sulfide copper concentrate, to remove part of Fe from the copper concentrate in the electric furnace so as to obtain copper matte with high copper and low iron. The copper matte is fed back to the reaction furnace to reduce the amount of Fe in the reaction furnace, thereby reduce the oxygen demand in the reaction furnace, the heat generation of the reaction and amount of slag, and reduce furnace gas amount and heat load of the space furnace, therefore it can process low-grade copper concentrate with high Fe and low Cu.

BRIEF DESCRIPTION OF THE DRAWINGS

FIG. 1 is a schematic graph of a process for extracting blister copper according to an embodiment of the present invention.

DESCRIPTION OF THE PREFERRED EMBODIMENTS

To further understand the present invention, preferred embodiments of the present invention are described in detail in combination with the following examples. However, it should be understood that these descriptions are only for further illustrating the characteristics and advantages of the present invention, but not for limiting the present invention.

The present invention provides a method for producing blister copper directly from copper concentrate, the step of which is shown by FIG. 1. FIG. 1 is a schematic graph of a process for extracting blister copper according to an embodiment of the present invention.

a) The reaction furnace in the present invention employs a space suspension furnace 1. Copper concentrate, copper matte, slagging material, oxygen enriched air, an endothermic material are together added into the space suspension furnace 1 from the top of the space suspension furnace 1 through swirl nozzle. The mass ratio of the copper concentrate and the copper matte, slagging material and endothermic material is 7~9:1~2:1. The slagging material is known in the art, such as $SiO_2$. The amount of oxygen-enriched air is 300 $Nm^3/t$~700 $Nm^3/t$ with respect to the copper concentrate and copper matte, and the concentration in volume of oxygen in the oxygen-enriched air is no less than 45%. The endothermic material can be the dust collected from the furnace gas discharged from the space suspension furnace 1.

In the space suspension reaction furnace, during the production of blister copper from copper concentrate, direct oxidation from $Cu_2S$ to blister copper actually generated a small proportion of blister copper, less than 10% by weight, the blister copper is mainly produced by the interaction reaction of over-oxidized $Cu_2O$ and $Fe_3O_4$ with under-oxidized $Cu_2S$, thus it is important to enhance the collision and combining probability of over-oxidized material and under-oxidized material. Oxygen in the oxygen-enriched air reacts with sulfur and iron in the copper concentrate in the upper segment space 11 of the space suspension reaction furnaces to deplete oxygen, generating a portion of the blister copper, the over-oxidized oxides and under-oxidized oxides. In the successive middle segment space 12 of the space suspension reaction furnaces, the over-oxidized oxides and under-oxidized oxides are subjected to collision, polymerization and inter-reaction to remove sulfur from the under-oxidized oxides, while producing most of blister copper.

b) After step a), there are still a large amount of $Cu_2O$ and $Fe_3O_4$. More specifically, generally $Cu_2O$ in the slag is more than 20% by weight, and $Fe_3O_4$ is more than 30% by weight. To eliminate the adverse effects of these two substances, the present invention proposes to introduce granulated reducing agent into the lower segment space 13 of the space suspension reaction furnace, the reducing agent preferably being a granular coke, with a particle size of 2 mm~25 mm. The coke can be added into the lower segment space 13 of the space suspension reaction furnace through a simple feed tube or lance. Within the lower segment space 13, oxygen in the oxygen enriched air added from the top has been depleted, therefore the granular coke reducing agent added into the furnace can not burn to increase the heat load of the reaction furnace, but absorbs heat to heating itself, resulting in certain cooling effect. After absorbing heat, the coke's own temperature increases. The coke will not be entrained by air due to its larger particle size, but deposits in the molten bath 14 at the bottom of the space suspension reaction furnace 1. Due to its relative smaller specific gravity, a read-hot coke layer 21 in solid state is formed in the upper layer of the molten bath 14. When $Cu_2O$ and $Fe_3O_4$ fall down through the hot coke layer 21, $Cu_2O$ is reduced by C to become blister copper, and $Fe_3O_4$ is reduced by C to become FeO, which not only improves slag property but also improves the direct recovery rate of blister copper. Finally separate phases are formed in the molten bath, i.e. $SO_2$-containing furnace gas, hot coke layer 21 in solid state, slag layer 22 in liquid state, and blister copper layer 23 in liquid state. The liquid blister copper are obtained by direct oxidation of $Cu_2S$ in copper concentrate and copper matte, interactive reaction of $Cu_2S$ with over-oxidized oxides, and reduction of over-oxidized $Cu_2O$ by red-hot coke.

$SO_2$-containing gas generated in the space suspension reaction furnace 1 is discharged through the uptake shaft 15, and can be introduced to a plant to produce acid after cooling and dust removal. A certain amount of CO will be generated during the reaction and be mixed in the furnace gas; to assure no CO contained in the furnace gas discharged from the reaction furnace and to avoid the adverse impact for subsequent producing acid system, it is preferred to supply oxygen-enriched air to the uptake shaft 15 to allow CO combustion, and also eliminate adherence at the outlet of the uptake shaft.

The liquid blister copper at the bottom can be fed to anode refining furnace 6 through launder to conduct blister copper refining.

c) The liquid slag and a portion of the red-hot coke are introduced through launder 3 to electric furnace 4. A sulphidizing agent, for example, sulfide copper concentrate with low copper, is added in the electric furnace at the same time. The sulphidizing agent can be the copper concentrate added to the space suspension reaction furnace 1, but without drying, that is, with moisture content being 4% by weight ~10% by weight. The mass ratio of the sulfide copper concentrate to the liquid slag can be 4~6:1. $Cu_2O$ and $Fe_3O_4$ contained in the slag are inter-reacted with FeS in the copper concentrate to generate $Cu_2S$ and FeO. The generated FeO slaggings with $SiO_2$ contained in the slag; and the generated $Cu_2S$ is combined with copper sulfide in the copper concentrate, and thus deposits and forms separate phases in the electric furnace 4, i.e., upper electric furnace slag 41 with low copper and lower copper matte 42 with high copper.

In this process, the copper compound carried in the slag is converted from $Cu_2O$ to $Cu_2S$, and eventually forms copper matte 42; the iron compound carried in the slag is converted from $Fe_3O_4$ with high melting point to FeO with low melting point, and FeO further slaggings together with $SiO_2$ carried in the slag to form $2FeO.SiO_2$ with lower melting point, which changes the character of the slag, and reduces viscisity, so as to facilitate the sedimentation and separation of copper matte 42 and electric furnace slag 41. Further, the slagging reaction not only supplies heat energy for the reaction in the electric furnace 4, and thus reduces the energy consumption of the furnace 4, but also transfers the reaction heat generated in the space suspension reaction furnace 1, so as to further reduce the heat load of the space suspension reaction furnace 1. The above process reduces the copper in the furnace slag 41 down to 0.4% by weight, and also removes a portion of the iron in the copper concentrate.

d) After granulation and finely ground by a mill 5, copper matte 42 flows back into the space suspension reaction furnace 1 as raw material from the top of the space suspension reaction furnace 1. Since the iron in the copper concentrate has been removed in the electric furnace 4, the character of the copper concentrate into the space spin-floating reaction furnace 1 has been greatly improved, that is, the copper concentrate with high Fe and low Cu has been changed to copper concentrate with high Cu and low Fe. The decreasing of iron in the copper concentrate into the space suspension reaction furnace 1 causes oxygen requirement and furnace gas of copper concentrate reaction decreasing, reducing the reaction heat and slag, thus solving the crucial problems in the production for blister copper blister copper directly from copper concentrate with high Fe and S and low Cu, such as large investment, low productivity and excessive heat load.

The electric furnace slag 41 can be used for other industrial raw material after granulation using a granulation process. Granulation process refers to traditional water granulation process, improved atomization process and dry granulation process, preferably dry granulation process. Mill 5 is a mill with drying function, for example, Raymond mill.

In addition, in practice, ingredients of copper concentrates are not constant, the contents of the main ingredients: Cu, Fe, S is usually variable. According to the method of the present invention, the thickness of the red-hot coke layer 21 can be controlled by controlling the feeding speed of the granular cokes into the space suspension reaction furnace. In turn, by controlling the thickness of the red-hot coke layer 21, the conversion rate of $Cu_2O$ and $Fe_3O_4$ in the space suspension reaction furnace can be controlled, i.e., the direct recovery rate of the space suspension reaction furnace of the present invention and the amount of the $Cu_2O$ and $Fe_3O_4$ contained in the slag can be controlled. The amount of the $Cu_2O$ and $Fe_3O_4$ contained in the slag determines the amount of copper concentrate to be processed in the electric furnace 4, and thus determines the amount of iron in the copper concentrate to be removed in the electric furnace 4. In the present invention, Fe into the space suspension reaction furnace 1 is reduced. According to a preferred embodiment of the present invention, the Fe in the copper concentrate is removed both in space suspension reaction furnace 1 and the electric furnace 4, thus the materials fed to the space suspension reaction furnace 1 are copper concentrate and copper matte therefore resolving the key problem of producing blister copper directly from copper concentrate with high Fe and low Cu in the prior art.

EXAMPLE

Materials fed into the space reaction furnace are totally 284 t/h, respectively as follows: copper concentrate 178 t/h, electric furnace copper matte 48.4 t/h, slagging material ($SiO_2$) 29.8 t/h, and an endothermic material (smoke dust) 27.8 t/h.

Copper concentrate ingredients: copper (Cu) 27.09%, iron (Fe) 25.02%, sulfur (S) 30.25%; oxygen enriched air: 120339 $Nm^3/h$ (oxygen concentration 48.28%). Copper matte fed into the space reaction furnace is actually a material from copper concentrate after the removal of iron, and thus the actual processed amount of copper concentrate is more than 210 t/h.

The above described a method for producing blister copper directly from copper concentrate provided by the present invention in detail. Specific examples are used herein to illustrate the principles and preferred embodiments of the present invention. The description of the above examples is used only for facilitating the understanding of the methods and the core idea of the present invention. It should be noted that for the skilled in the art, a number of variations and modifications can be made to the present invention without departing from the principles of the present invention, such variations and modifications also fall within the scope claimed by the present invention as set forth in the claims.

The invention claimed is:

1. A method for producing blister copper directly from copper concentrate, characterized in that it comprises the following steps:
   a) feeding copper concentrate, copper matte, slagging material, oxygen enriched air, and endothermic material together into a reaction furnace at an upper segment of the reaction furnace;
   b) feeding reducing agent into the reaction furnace at the lower segment of the reaction furnace, wherein furnace gas, a hot coke layer in solid state, a slag layer in liquid state, and a blister copper layer in liquid state are formed in a molten bath at the bottom of the reaction furnace;
   c) directing the hot coke and the slag in liquid state into an electric furnace while feeding sulfidizing agent into the electric furnace, so as to produce an electric furnace slag and copper matte in the electric furnace;
   d) granulating the copper matte and re-feeding it into the reaction furnace at the upper segment of the reaction furnace,
   wherein the sulfidizing agent in step c) is sulfide copper concentrate with a moisture content of 4% by weight to 10% by weight, the mass ratio of said sulfide copper concentrate to said slag in liquid state is 4~6:1.

2. The method according to claim 1, characterized in that mass ratio of the copper concentrate to the copper matte, slagging material and endothermic material added in step a) is in the range from 7~9:1 to 2:1, amount of oxygen-enriched air is 300 $Nm^3/t$~700 $Nm^3/t$ with respect to the copper concentrate and the copper matte, and concentration in volume of oxygen in the oxygen-enriched air is ≥45%.

3. The method according to claim 1 or 2, characterized in that the reaction furnace is a space suspension reaction furnace.

4. The method according to claim 1 or 2, characterized in that the endothermic material is smoke dust collected from furnace gas discharged from the reaction furnace.

5. The method according to claim 1 or 2, characterized in that the reducing agent in the step b) is granular coke with a particle size of 2 mm~25 mm.

6. The method according to claim 1 or 2, characterized in that the blister copper obtained from the step b) is directed into an anode refining furnace to undergo a refining process.

7. The method according to claim 1 or 2, characterized in that the electric furnace slag in the step c) is used as other industrial raw material after granulation.

8. The method according to claim 1 or 2, characterized in that oxygen-enriched air is directed into an uptake shaft of the reaction furnace to burn CO produced in said reaction furnace.

* * * * *